2,753,333

CUPRIFEROUS TRISAZO-DYESTUFFS

Henri Riat, Arlesheim, Switzerland, assignor to Ciba Limited, Basel, Switzerland, a Swiss firm No Drawing. Application October 27, 1952, Serial No. 317,131

15 Claims. (Cl. 260—147)

The present invention provides cupriferous trisazo-dyestuffs which, like the dyestuff of the formula (1)
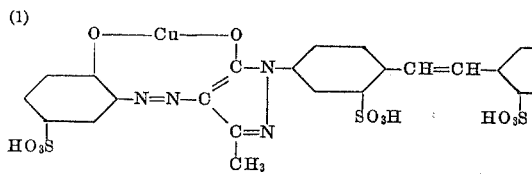

correspond to the general formula (2)
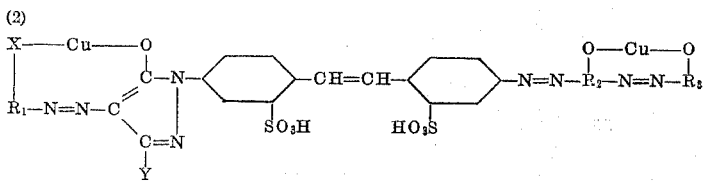

in which:

X represents a hydroxyl or carboxylic acid group occupying a position vicinal to the azo-linkage and bound in complex union with the copper atom,
Y represents a methyl or carboxylic acid group,
$R_1$ represents an aromatic radical of the benzene series,
$R_2$ represents a benzene or naphthalene radical bound in para-position to the azo linkages, and
$R_3$ represents an aromatic radical, and in which the group —O—Cu—O— is bound to the radicals $R_2$ and $R_3$ in positions vicinal to the azo linkage.

These cupriferous trisazo-dyestuffs are made in accordance with the invention by treating a trisazo-dyestuff corresponding to the general formula (3)
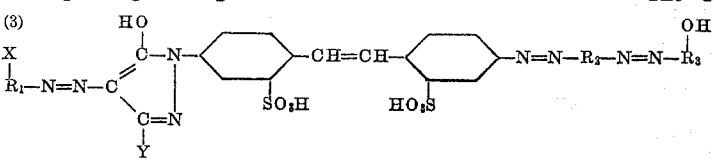

in which:

$R_1$ represents an aromatic radical of the benzene series containing as a substituent in ortho-position to the azo linkage a hydroxyl, alkoxy or carboxylic acid group,
$R_2$ represents a benzene or naphthalene radical bound in para-position to the azo groups and containing in ortho-position to the —N=N—$R_3$ group a hydroxyl or alkoxy group, and
$R_3$ represents an aromatic radical bound to the azo-linkage in a position vicinal to the hydroxyl group, with an agent yielding copper in such manner that any ortho-alkoxy-ortho'-hydroxy-azo-groupings are converted into ortho:ortho'-dihydroxy-azo-copper complexes.

The trisazo-dyestuffs of the Formula 3 serving as starting materials can be made by coupling the diazo compound of an amine of the formula

with a pyrazolone of the formula (4)
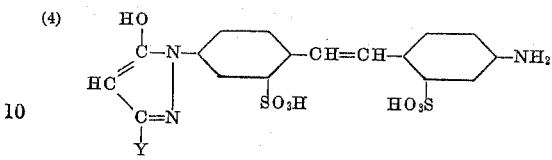

diazotizing the resulting amino-monoazo-dyestuff, and coupling it with a middle component of the formula

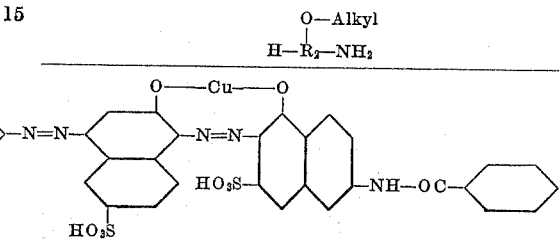

and finally coupling the diazo compound obtained from

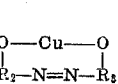

the resulting amino-disazo-dyestuff with a suitable end component of the formula

and advantageously a hydroxynaphthalene capable of coupling in ortho-position with respect to the hydroxyl group.

In general it is of advantage to choose initial components which contain, in addition to the alkoxy group (advantageously methoxy), carboxylic acid group or hydroxyl group occupying a position vicinal to the diazotizable amino group, a group imparting solubility, especially a sulfonic acid group.

The following compounds may be mentioned as examples of initial components:

4-amino-1-hydroxybenzene-2-carboxylic acid, 2-amino-1-hydroxybenzene-4-sulfonic acid amide, 2-amino-1-hydroxybenzene-4-sulfonic acid, 2-amino-1-hydroxybenzene-4-sulfonic acid-6-carboxylic acid, 2-amino-1-hydroxybenzene-4:6-disulfonic acid, 4-chloro-2-amino-1-hydroxybenzene-6-sulfonic acid, 1-amino-2-methoxybenzene, 1-amino-2-methoxybenzene-5-sulfonic acid, 1-aminobenzene-2-carboxylic acid, 1-aminobenzene-2-carboxylic acid-5-sulfonic acid, 1-aminobenzene-2-carboxylic acid-4-sulfonic acid, 5-ethoxy-1-aminobenzene-2-carboxylic acid and 1-amino-2-carboxymethoxy-5-methoxybenzene.

As pyrazolones of the Formula 4 there come into consideration 1-[4''-aminostilbene-(4')]-5-pyrazolone-3-carboxylic acid-2':2''-disulfonic acid and especially 1-[4'' aminostilbene - (4')] - 3 - methyl-5-pyrazolone-2':2'''-disulfonic acid of the formula

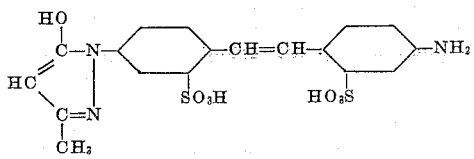

The aminoazo-dyestuffs obtainable from the above mentioned initial components and pyrazolones are after converting them into their diazo compounds, coupled with a middle component of the formula HR₂—NH₂, the latter component containing as a group capable of forming metal complexes in ortho-position to the amino group, for example, a hydroxyl, carboxymethoxy, an ethoxy or advantageously a methoxy group. There may be used middle components of the benzene or naphthalene series such, for example, as 1-amino-2-methoxy-5-methylbenzene, 1-amino-2:5-dimethoxybenzene, 1-amino-2:5-diethoxybenzene, 1-amino-2-methoxy-5-ethoxybenzene, 1-amino-2-ethoxy-5-methoxybenzene, 1-amino-2-methoxycarboxy-5-methylbenzene or 1-amino-2-hydroxy-5-methylbenzene. Especially valuable dyestffs are obtained from 1-amino-2-alkoxynaphthalenes and above all from 1-amino-2-alkoxynaphthalene-6- or -7-sulfonic acids. As examples there may be mentioned 1-amino-2-methoxynaphthalene, 1-amino-2-ethoxynaphthalene, 1-amino-2-methoxynaphthalene-6-sulfonic acid, 1-amino-2-methoxynaphthalene-7-sulfonic acid and 1-amino-2-ethoxynaphthalene-6- or -7-sulfonic acid.

As end components of the formula

there come into consideration aryl compounds capable of coupling in ortho-position relatively to a hydroxyl group, advantageously those of the naphthalene series such as 2-hydroxynaphthalenes, hydroxynaphthalene sulfonic acids and especially aminohydroxynaphthalene sulfonic acids containing a substituted amino group, for example, an arylamino group or acylamino group. As examples there may be mentioned: 2-hydroxynaphthalene, 2-hydroxynaphthalene-6-sulfonic acid, 1-hydroxynaphthalene-4-sulfonic acid, 1-hydroxynaphthalene-3:6- or -3:8-disulfonic acid, 2-hydroxynaphthalene-3:6-disulfonic acid, 1:8-dihydroxynaphthalene-3:6-disulfonic acid, 1-amino-5-hydroxynaphthalene-7-sulfonic acid, 1-amino-8-hydroxynaphthalene-4-sulfonic acid, 2-amino-5-hydroxynaphthalene-7-sulfonic acid, 2-amino-8-hydroxynaphthalene-6-sulfonic acid, 2-amino-6-hydroxynaphthalene-8-sulfonic acid, 1-amino-8-hydroxynaphthalene-2:4- or -3:6- or -4:6-disulfonic acid, 1-acetylamino-8-hydroxynaphthalene-3:6-disulfonic acid, 1-benzoylamino-8-hydroxynaphthalene-3:6-disulfonic acid, 1-benzoylamino-8-hydroxynaphthalene-4-sulfonic acid, 2-acetylamino-6-hydroxynaphthalene-8-sulfonic acid, 2-benzoylamino-6-hydroxynaphthalene-8-sulfonic acid; nitrogen - substituted 2-amino-5-hydroxynaphthalene-7-sulfonic acids, such as 2-acetylamino-5-hydroxynaphthalene-7-sulfonic acid, 2-benzoylamino-5-hydroxynaphthalene-7-sulfonic acid, 2-(4'-chlorobenzoylamino)-5-hydroxynaphthalene-7-sulfonic acid, 2-phenylamino-5-hydroxynaphthalene-7-sulfonic acid, 2-(2'- or 4-methoxyphenylamino)-5-hydroxynaphthalene-7-sulfonic acid, 2-(3'- or 4'-carboxymethoxyphenylamino)-5-hydroxynaphthalene-7-sulfonic acid, 2-(4'-methylphenylamino)-5-hydroxynaphthalene-7:3'-disulfonic acid, 2-(4'-chlorophenylamino)-5-hydroxynaphthalene-7:3'-disulfonic acid, 2-phenylamino-5-hydroxynaphthalene-7:3'- or -7:4'-disulfonic acid.

The dyestuffs of the Formula 3 can be made by the usual known methods. The coupling of the initial component with the pyrazolone is advantageously carried out in a weakly alkaline medium, and coupling with the middle component in a weakly acid to neutral medium, while the final coupling is advantageously carried out in the presence of pyridine.

In order that the cupriferous dyestuffs obtained by the present process shall be sufficiently soluble it is generally necessary so to choose the components used for synthesizing the initial dyestuffs of the general Formula 3, that the dyestuffs contain at least four and advantageously 4–6 sulfonic acid groups.

The treatment with an agent yielding copper is carried out in such manner that the cupriferous dyestuffs of the Formula 2 are obtained from the dyestuffs of the Formula 3 with the conversion of any ortho-alkoxy-ortho'-hydroxyazo-groupings into ortho:ortho'-dihydroxyazo-copper complexes, that is to say, in such manner that two atoms of copper are bound in complex union for each molecule of disazo dyestuff accompanied by dealkylation of the alkoxy groups taking part in the formation of the complex. As is known this reaction takes place more easily with ortho:ortho'-dihydroxy-azo-groupings than with ortho-hydroxy-ortho'-alkoxy-azo-groupings, so that in the latter case a longer duration of treatment and/or a treatment at a higher temperature is indicated. The coppering may be carried out, for example, with salts of divalent copper in a weakly acid aqueous medium. However, the dyestuffs can also be coppered by the known process in which the coppering is carried out advantageously for several hours in the vicinity of 100° C. in an aqueous medium with the use of a copper tetrammine complex in the presence or absence of an excess of amine or ammonia. Of special advantage in some cases of this kind is the process which is carried out in the presence of an hydroxyalkylamine, especially ethanolamine or a copper complex derived therefrom.

Dyestuffs of the general Formula 3, of which the radical R₂ represents a naphthalene radical containing an alkoxy group in a position vicinal to the azo linkage connecting R₂ and R₃, for example, dyestuffs in which the radical R₂ corresponds to the formula

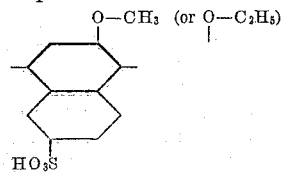

are in general coppered with advantage by means of copper sulfate with the addition of an alkali acetate.

On the other hand it has been found that in the case of those dyestuffs which contain at the aforesaid position in the molecule an alkoxy-benzene radical, for example, one of the formulae

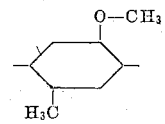

or

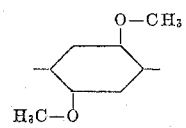

or

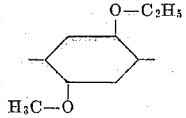

the conversion into the ortho:ortho'-dihydroxy-copper complex is advantageously carried out with the use of copper tetrammine sulfates.

The cupriferous dyestuffs obtainable by the process of the invention are new and correspond to the above Formula 2. This formula undoubtedly gives the correct stoichiometric quantities of copper and the correct positions of the copper atoms in the complex, but the distribution of the main and secondary valences in the complex union of the copper has not been established with certainty.

The new cupriferous dyestuffs of the Formula 2 can be used for dyeing or printing a very wide variety of materials such as wool, silk and especially cellulose fibers, such as cotton, linen and also artificial silk and staple fibers of regenerated cellulose. In general grey to olive-green dyeings of good fastness to light are obtained, which also withstand an ordinary anti-creasing treatment, for example, by means of urea-formaldehyde artificial resins.

The following examples illustrate the invention, the parts and percentages being by weight:

*Example 1*

21.7 parts of 1-aminobenzene-2-carboxylic acid-4-sulfonic acid are dissolved in 150 parts of water with 11 parts of anhydrous sodium carbonate, then acidified with 25 parts of hydrochloric acid of 30 per cent. strength, and diazotized at 5–10° C. with 6.9 parts of sodium nitrite dissolved in 50 parts of water. The diazo-compound is coupled with 43 part of 1-[4″-aminostilbene-(4′)]-3-methyl-5-pyrazolone-2′:2″-disulfonic acid in a solution rendered alkaline with sodium bicarbonate. The excess of sodium bicarbonate is neutralized with hydrochloric acid, the solution is mixed with 6.9 parts of sodium nitrite, and the monoazo-dyestuff is diazotized by pouring in 40 parts of hydrochloric acid of 30 per cent. strength. After stirring for 2–3 hours at room temperature the mixture is neutralized with sodium acetate, and coupled with 25.3 parts of 1-amino-2-methoxynaphthalene-6-sulfonic acid dissolved in the form of its sodium salt with 20 parts of sodium acetate in 200 parts of water. By gradually adding 40 parts of sodium carbonate solution of 10 per cent. strength the coupling is accelerated. When the coupling is finished, the coupling mixture is rendered alkaline with sodium carbonate, and the disazo-dyestuff is salted out and filtered off. The dyestuff paste is dissolved in 1500 parts of water with the addition of sodium hydroxide solution, then mixed with 7 parts of sodium nitrite, and diazotized by pouring in 40 parts of hydrochloric acid of 30 per cent. strength. The whole is stirred for about 1 hour at room temperature, and the diazo compound, after being filtered off and stirred in 1500 parts of ice water, is introduced into a solution, cooled to 5° C., of 28 parts of 2-acetylamino-5-hydroxynaphthalene-7-sulfonic acid, 25 parts of sodium bicarbonate and 150 parts of pyridine in 200 parts of water. When the coupling has finished, the disazo-dyestuff of the formula

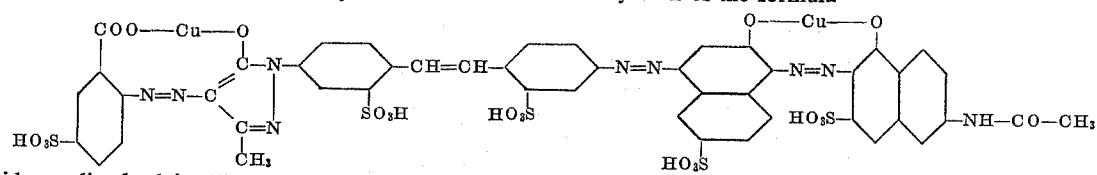

is salted out, filtered off, and boiled in 50 parts of crystalline copper sulfate and 40 parts of sodium acetate in 3000 parts of water for 10 hours under reflux, in order to form the copper complex. The copper complex is then salted out, filtered off, and converted in the usual manner into its sodium salt. When dry, the dyestuff is a dark powder which dissolves in water with an olive-green coloration, and dyes cotton olive-green tints which are fast to light.

In the following table are given a number of further valuable trisazo-dyestuffs, which are made by coupling in the manner described in this example the diazo compounds given in column I with 1-[4″-aminostilbene-(4′)]-3-methyl-5-pyrazolone-2′:2″-disulfonic acid, diazotizing again, and coupling with the middle components given in column II, again diazotizing the aminodisazo-dyestuffs so obtained and coupling with the end components given in column III, and converting the trisazo dyestuffs into their complex copper compounds.

| | I<br>Initial component | II<br>Middle component | III<br>End component | IV<br>Tint of dyeing of the complex compound on cotton |
|---|---|---|---|---|
| 1 | 1-aminobenzene-2-carboxylic acid-4-sulfonic acid. | 1-amino-2-methoxynaphthalene-6-sulfonic acid. | 2-benzoylamino-5-hydroxynaphthalene-7-sulfonic acid. | olive-green. |
| 2 | ...do... | ...do... | 1-acetylamino-8-hydroxynaphthalene-4-sulfonic acid. | olive. |
| 3 | ...do... | ...do... | 1-benzoylamino-8-hydroxynaphthalene-4-sulfonic acid. | Do. |
| 4 | ...do... | ...do... | 2-benzoylamino-6-hydroxynaphthalene-8-sulfonic acid. | Do. |
| 5 | ...do... | ...do... | 2-acetylamino-6-hydroxynaphthalene-8-sulfonic acid. | Do. |
| 6 | ...do... | ...do... | 2-phenylamino-8-hydroxynaphthalene-6-sulfonic acid-3′-carboxylic acid. | Do. |
| 7 | ...do... | ...do... | 2-hydroxynaphthalene-6-sulfonic acid. | green-olive. |
| 8 | ...do... | ...do... | 1-hydroxynaphthalene-4-sulfonic acid. | olive. |
| 9 | ...do... | ...do... | 2-hydroxynaphthalene. | green-olive. |
| 10 | ...do... | 1-amino-2-methoxynaphthalene. | 2-acetylamino-5-hydroxynaphthalene-7-sulfonic acid. | yellowish green. |
| 11 | ...do... | 1-amino-2-ethoxynaphthalene-6-sulfonic acid. | ...do... | olive-green. |
| 12 | 1-aminobenzene-2-carboxylic acid-5-sulfonic acid. | 1-amino-2-methoxynaphthalene-6-sulfonic acid. | 2-acetylamino-5-hydroxynaphthalene-7-sulfonic acid. | Do. |
| 13 | 1-aminobenzene-2-carboxylic acid. | ...do... | ...do... | green-olive. |
| 14 | 1-aminobenzene-2-carboxylic acid-4-sulfonic acid. | 1-amino-2-methoxynaphthalene-7-sulfonic acid. | ...do... | olive green. |

Dyestuff No. 3 of the above table corresponds to the formula

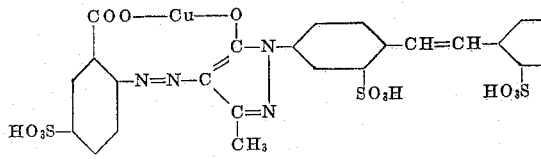
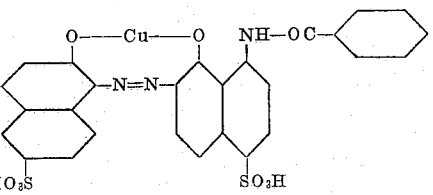

Example 2

The disazo-dyestuff (1-aminobenzene - 2 - carboxylic acid - 4 - sulfonic acid→1 - [4″ - aminostilbene - (4′)]- 3 - methyl - 5 - pyrazolone - 2′:2″ - disulfonic acid→ 1-amino-2-methoxynaphthalene-6-sulfonic acid) obtained as described in Example 1 is diazotized. The diazo compound is filtered off, stirred in ice water and coupled in the presence of 30 parts of sodium bicarbonate and 100 parts of pyridine with 40 parts of 2-(4′-methylphenyl-amino)-5-hydroxynaphthalene-7:3′-disulfonic acid in 300 parts of water. The trisazo-dyestuff so formed is salted out, filtered off and converted into its copper complex by heating it at the boil under reflux for 6 hours with 50 parts of crystalline copper sulfate, 100 parts of ammonia solution of 25 per cent. strength and 20 parts of ethanolamine in 2000 parts of water. The copper complex, after being worked up, in a dark powder which dissolves in water with a green coloration and dyes cotton yellowish green tints which are fast to light.

By using, instead of 2-(4′-methyl)-phenylamino-5-hydroxynaphthalene-7:3′-disulfonic acid, 2-phenylamino-5-hydroxynaphthalene-7-sulfonic acid or 2-(4′-carboxy-methoxyphenylamino)-5-hydroxynaphthalene-7 - sulfonic acid there are obtained dyestuffs having similar properties. The trisazo dyestuff obtained this way with 2-phenylamino-5-hydroxy-naphthalene-7-sulfonic acid corresponds to the formula

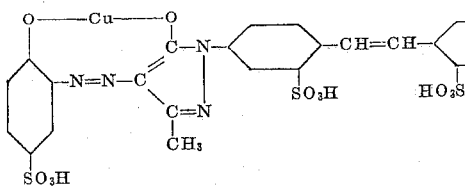

Instead of the above mentioned disazo-dyestuff, there may be used the corresponding diazo-dyestuff from 1 - [4″ - aminostilbene - (4′)] - 5 - pyrazolone - 3 - carboxylic acid-2′:2″-disulfonic acid.

By using, instead of 2-(4′-methylphenylamino)-5-hydroxynaphthalene-7:3′-disulfonic acid, 2-phenylamino-8-hydroxynaphthalene-6:3′-disulfonic acid or 2-phenylamino - 8 - hydroxynaphthalene - 6 - sulfonic acid - 3′ - carboxylic acid, there are obtained cupriferous dyestuffs which dye cotton olive tints.

Example 3

20.3 parts of 2-amino-1-methoxybenzene-4-sulfonic acid are diazotized in the usual manner, and the diazo compound is introduced into a solution, rendered alkaline with sodium carbonate, of 43 parts of 1-[4″-amino-stilbene - (4′)] - 3 - methyl - 5 - pyrazolone - 2′:2″ - disulfonic acid. When the coupling is finished, the excess of sodium carbonate is neutralized with hydrochloric acid, the partially precipitated monoazo-dyestuff is again brought into solution by means of a small amount of sodium hydroxide solution, then mixed with 6.9 parts of sodium nitrite and diazotization is brought about by pouring in 40 parts of hydrochloric acid of 30 per cent. strength at 15–20° C. The whole is stirred for about 2 hours, neutralized with sodium bicarbonate until Congo paper gives a violet coloration, and the diazo compound is coupled with a neutral solution of 25.3 parts of 1-amino-2-methoxynaphthalene-6-sulfonic acid and 20 parts of sodium acetate in 100 parts of water. By gradually adding 4 parts of sodium carbonate in 50 parts of water the coupling is brought to an end. The coupling mixture is rendered alkaline with sodium hydroxide solution, and the disazo-dyestuff is salted out and filtered off. The dyestuff paste is dissolved in 1500 parts of water, if desired with the addition of a small amount of sodium hydroxide solution, then mixed with 7 parts of sodium nitrite and 200 parts of sodium chloride, and diazotized by pouring in 40 parts of hydrochloric acid of 30 per cent. strength. The whole is stirred at 15–20° C., filtered off, the diazo compound is stirred in 1500 parts of ice water, and the resulting suspension is introduced into an ice-cold solution of 35 parts of 2-benzoylamino-5-hydroxy-naphthalene-7-sulfonic acid, 30 parts of sodium carbonate, 150 parts of pyridine and 200 parts of water. When the coupling is finished, the trisazo-dyestuff of the formula

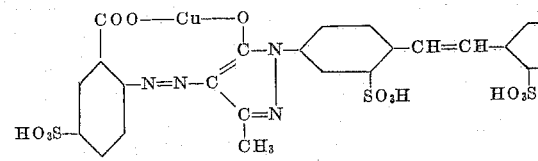
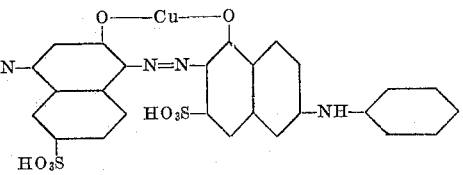

is salted out, filtered off and boiled under reflux for 10 hours in 4000 parts of water with 50 parts of crystalline copper sulfate in the presence of 40 parts of sodium acetate. The resulting complex copper compound is then salted out with sodium chloride, filtered off, and converted into its sodium salt in known manner. The dyestuff when dry is a dark powder and dyes cotton olive tints.

By using in this example, instead of the 2-benzoyl-amino-5-hydroxynaphthalene-7-sulfonic acid, a corresponding quantity of 2-acetylamino-5-hydroxynaphthalene-7-sulfonic acid a similar dyestuff is obtained.

Example 4

The diazo compound from 18.9 parts of 2-amino-1-hydroxybenzene-4-sulfonic acid is coupled in a solution rendered alkaline with sodium carbonate with 43 parts of 1 - [4″ - aminostilbene - (4′)] - 3 - methyl - 5 - pyrazolone-2′:2″-disulfonic acid, the monoazo-dyestuff is diazotized as described in Example 3 then mixed with 40 parts of sodium acetate, and coupled with 13.7 parts of 1-amino-2-methoxy-5-methylbenzene, dissolved in 100 parts of water and 11 parts of hydrochloric acid of 30 per cent strength. The disazodyestuff is separated, if desired, purified by reprecipitation, dissolved in 2000 parts of water having a weakly alkaline reaction, mixed with 7.2 parts of sodium nitrite, and diazotized by pouring in 40 parts of hydrochloric acid of 30 per cent. strength. The whole is stirred for 1–2 hours at 20° C., coupled with 35 parts of 2-benzoylamino-5-hydroxynaphthalene7-sulfonic acid in a solution rendered alkaline with sodium carbonate, in the presence of 40 parts of pyridine. The resulting trisazo-dyestuff is filtered off. In order to convert the dyestuff into its copper complex, the dyestuff paste is dissolved in 3000 parts of hot water with the addition of 40 parts of ethanolamine. The solution is mixed with an ammoniacal solution of copper sulfate (corresponding to 50 parts of $CuSO_4.5H_2O$) and heated at 95° C. for 8–10 hours. The resulting copper complex is then precipitated by means of sodium chloride, filtered off and dried. There is obtained a blackish powder which dissolves in warm water with an olive-grey coloration and dyes cotton grey tints.

By using in this example, instead of the 2-benzoylamino-5-hydroxynaphthalene-7-sulfonic acid, the corresponding quantity of 2 - acetylamino - 5 - hydroxynaphthalene-7-sulfonic acid a dyestuff having similar properties is obtained.

By using as initial component, instead of 2-amino-1-hydroxybenzene-4-sulfonic acid, 2-amino-1-hydroxybenzene-4-sulfonic acid-6-carboxylic acid there is obtained a dyestuff which corresponds to the formula

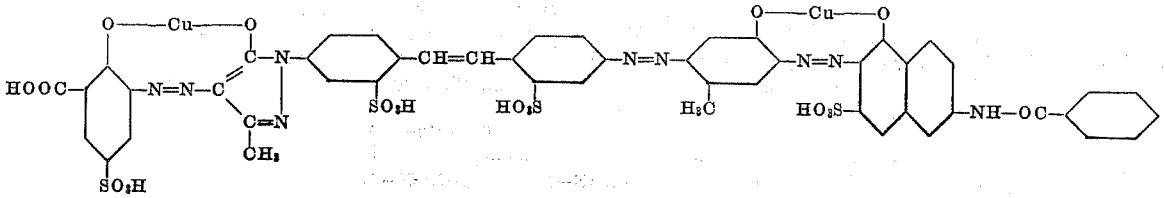

and which also dyes cotton grey tints.

Example 5

The diazo compound, which has been obtained by diazotizing the monoazo-dyestuff of Example 1 from 21.7 parts of 1 - aminobenzene - 2 - carboxylic acid - 4 - sulfonic acid and 43 parts of 1 - [4″ - aminostilbene - (4′)]-3-methyl-5-pyrazolone-2′:2″-disulfonic acid, is coupled in the presence of sodium acetate with 1-amino-2-methoxy-5-methylbenzene, and the resulting disazo-dyestuff is separated, if desired, purified by reprecipitation, diazotized by the indirect method and coupled in a solution rendered alkaline with sodium carbonate and in the presence of 40 parts of pyridine with 35 parts of 2 - benzoylamino - 5 - hydroxynaphthalene - 7 - sulfonic acid. The trisazo-dyestuff is isolated and converted by the method of Example 4 into its copper complex which dyes cotton olive tints.

By using in this example, instead of 1 - amino - 2 - methoxy - 5 - methylbenzene, a corresponding quantity of 1 - amino - 2:5 - dimethoxybenzene, there is obtained a dyestuff which dyes cotton somewhat more yellowish olive tints.

By using in this example, instead of 1 - [4″ - aminostilbene - (4′)] - 3 - methyl - 5 - pyrazolone - 2′:2″ - disulfonic acid, 1 - [4″ - aminostilbene - (4′)] - 5 - pyrazolone-3 - carboxylic acid - 2′:2″ - disulfonic acid there is obtained a dyestuff having similar properties.

Example 6

100 parts of cotton are entered at 40° C. into a dyebath which contains in 3000 parts of water 1 part of the dyestuff obtainable as described in the first paragraph of Example 1. The dyeing is carried on for ½ hour while increasing the temperature to 90° C., 30 parts of crystalline sodium sulfate are added, and dyeing is continued for a further ½ hour at 90–95° C. The cotton is then rinsed and dried. There is obtained an olive green dyeing of very good fastness to light.

What is claimed is:

1. A cupriferous trisazo-dyestuff of the formula

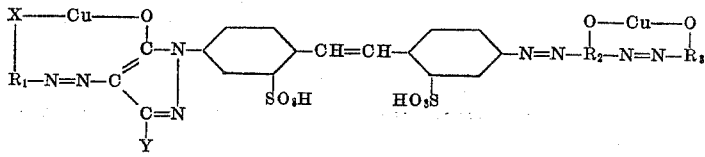

in which X represents a member selected from the group consisting of a hydroxyl group and a carboxylic acid group, said group occupying a position vicinal to the azo linkage and bound in complex union with the copper atom, Y represents a member selected from the group consisting of a methyl and a carboxylic acid group, $R_1$ represents an aromatic radical of the benzene series, $R_2$ represents a member selected from the group consisting of a benzene and a naphthalene radical bound in paraposition to the azo-linkages and $R_3$ represents an aromatic radical of the naphthalene series, the group —O—Cu—O— being bound to the radicals $R_2$ and $R_3$ in positions vicinal to the azo linkage.

2. A cupriferous trisazo-dyestuff of the formula

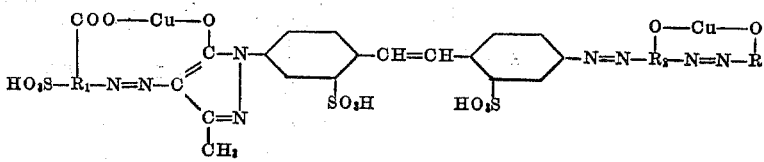

in which the —COO—group stands in ortho-position to the azo linkage, $R_1$ represents an aromatic radical of the benzene series, $R_2$ represents a naphthalene radical bound in paraposition to the azo-linkages and $R_3$ represents an aromatic radical of the naphthalene series, the group —O—Cu—O— being bound to the radicals $R_2$ and $R_3$ in positions vicinal to the azo linkage.

3. A cupriferous trisazo-dyestuff of the formula

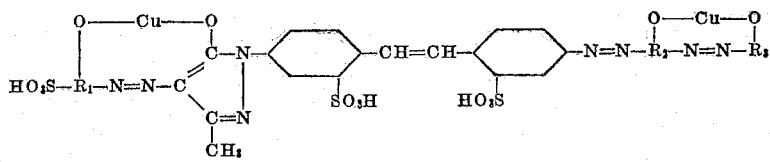

in which the —O—Cu—O— group bound to R₁ stands in orthoposition to the azo linkage, R₁ represents an aromatic radical of the benzene series, R₂ represents a naphthalene radical bound in para-position to the azo linkages and R₃ represents an aromatic radical of the naphthalene series, the group —O—Cu—O— being bound to the radicals R₂ and R₃ in positions vicinal to the azo linkage.

4. A cupriferous trisazo-dyestuff of the formula

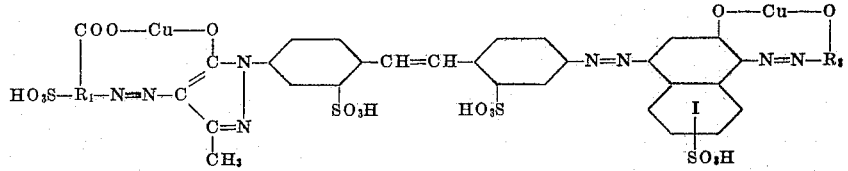

in which the —COO—group stands in ortho-position to the azo-linkage, R₁ represents an aromatic radical of the benzene series and R₃ represents an aromatic radical of the naphthalene series bound to the —O—Cu—O—group in ortho-position to the azo linkage, the sulfonic acid group in the naphthalene nucleus I occupying a β-position.

5. A cupriferous trisazo-dyestuff of the formula

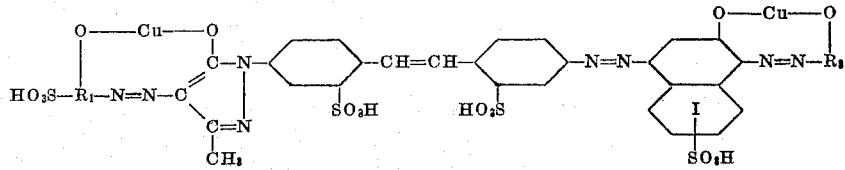

in which the —O—Cu—O—group bound to R₁ stands in ortho-position to the azo-linkage, R₁ represents an aromatic radical of the benzene series and R₃ represents an aromatic radical of the naphthalene series bound to the —O—Cu—O—group in orthoposition to the azo linkage, the sulfonic acid group in the naphthalene nucleus I occupying a β-position.

6. A cupriferous trisazo-dyestuff of the formula

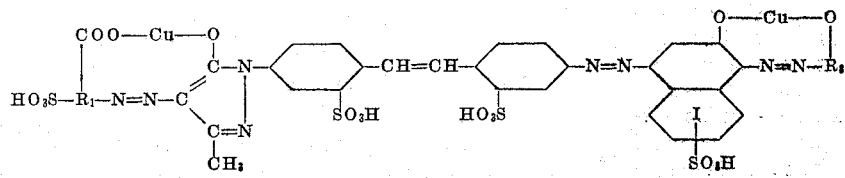

in which the —COO—group stands in ortho-position to the azo-linkage, R₁ represents an aromatic radical of the benzene series and R₃ represents an aromatic radical of the naphthalene series containing a substituted amino group and at least one sulfonic acid group and being bound to the —O—Cu—O—group in ortho-position to the azo linkage, the sulfonic acid group in the naphthalene nucleus I occupying a β-position.

7. A cupriferous trisazo-dyestuff of the formula

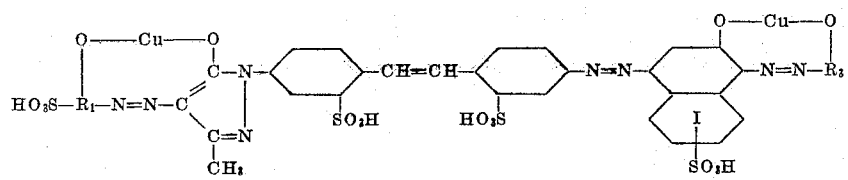

in which the —O—Cu—O—group bound to R₁ stands in ortho-position to the azo-linkage, R₁ represents an aromatic radical of the benzene series and R₃ represents an aromatic radical of the naphthalene series containing a substituted amino group and at least one sulfonic acid group and being bound to the —O—Cu—O—group in ortho-position to the azo linkage, the sulfonic acid group in the naphthalene nucleus I occupying a β-position.

8. A cupriferous trisazo-dyestuff of the formula

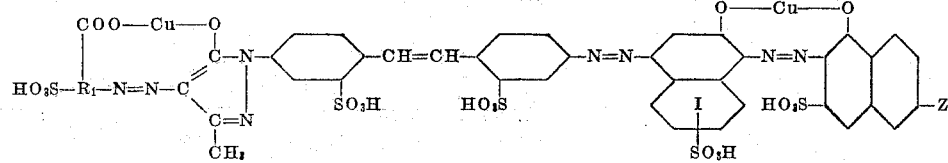

in which the —COO—group stands in ortho-position to the azo linkage, R₁ represents an aromatic radical of the benzene series and Z represents a substituted amino group.

9. A cupriferous trisazo-dyestuff of the formula

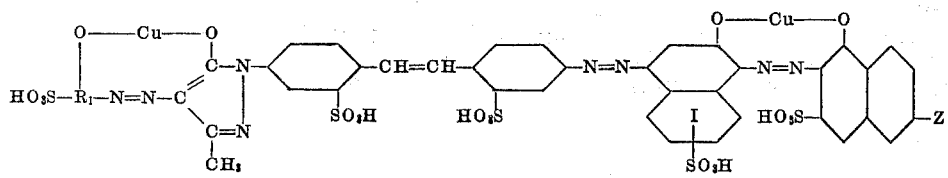

in which the —O—Cu—O—group bound to $R_1$ stands in ortho-position to the azo linkage, $R_1$ represents an aromatic radical of the benzene series and Z represents a substituted amino group.

10. A cupriferous trisazo dyestuff of the formula

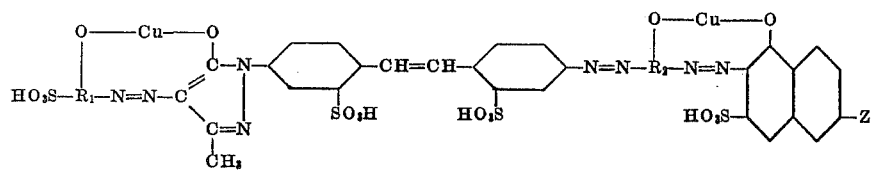

in which the —O—Cu—O—group bound to $R_1$ stands in ortho-position to the azo linkage, the —O—Cu—O—group bound to $R_2$ stands in ortho-position to the azo linkage connecting $R_2$ with the naphthalene nucleus, $R_1$ represents an aromatic radical of the benzene series and $R_2$ represents a benzene radical bound in para-position to the azo linkages.

11. The cupriferous trisazo dyestuff of the formula

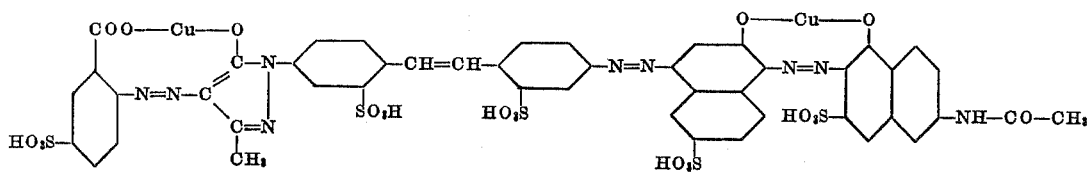

12. The cupriferous trisazo dyestuff of the formula

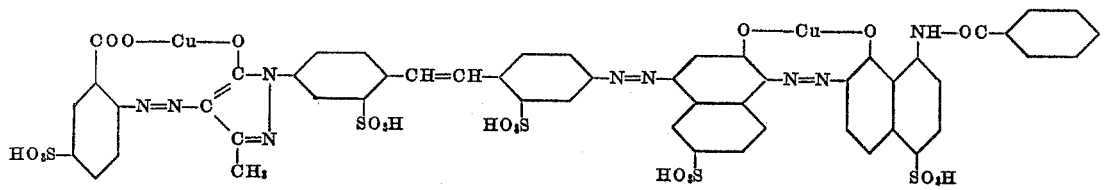

13. The cupriferous trisazo dyestuff of the formula

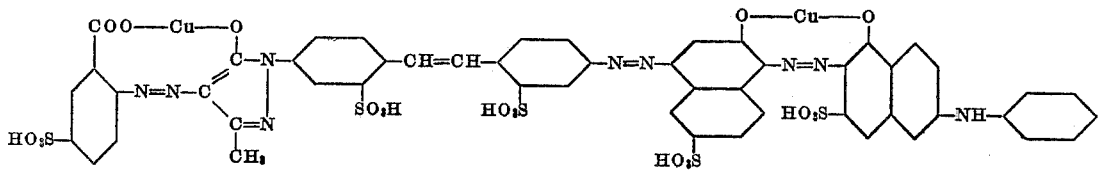

14. The cupriferous trisazo dyestuff of the formula

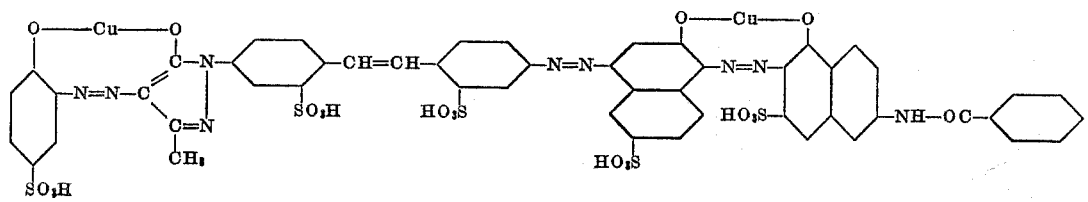

15. The cupriferous trisazo dyestuff of the formula
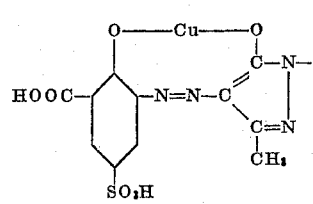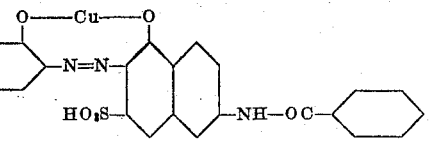
References Cited in the file of this patent
UNITED STATES PATENTS
| | | |
|---|---|---|
| 2,277,544 | Fischer et al. | Mar. 24, 1942 |
| 2,399,447 | Moser | Apr. 30, 1946 |